United States Patent
Zhu et al.

(10) Patent No.: US 11,425,785 B2
(45) Date of Patent: Aug. 23, 2022

(54) NETWORK SWITCHING METHOD, ELECTRONIC DEVICE, AND SYSTEM ON CHIP

(71) Applicant: Huawei Technologies Co., Ltd., Shenzhen (CN)

(72) Inventors: Jianjian Zhu, Shenzhen (CN); Rahul Arvind Jadhav, Bangalore (IN); Neng Yang, Shenzhen (CN); Zhen Cao, Beijing (CN); Fanzhao Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/847,175

(22) Filed: Apr. 13, 2020

(65) Prior Publication Data
US 2020/0245406 A1    Jul. 30, 2020

Related U.S. Application Data

(63) Continuation of application No. PCT/CN2019/081638, filed on Apr. 6, 2019.

(30) Foreign Application Priority Data

Aug. 2, 2018  (CN) .......................... 201810872929.1

(51) Int. Cl.
*H04W 84/12*  (2009.01)
*H04W 36/14*  (2009.01)
(Continued)

(52) U.S. Cl.
CPC ........... *H04W 84/12* (2013.01); *H04W 36/14* (2013.01); *H04W 36/30* (2013.01); *H04W 48/18* (2013.01); *H04W 88/06* (2013.01); *H04W 92/02* (2013.01)

(58) Field of Classification Search
CPC ..... H04W 84/12; H04W 36/14; H04W 36/30; H04W 48/18; H04W 88/06; H04W 92/02;
(Continued)

(56) References Cited

U.S. PATENT DOCUMENTS 7,773,563 B2 *  8/2010  Lee ....................... H04W 36/26
                                                              370/331
9,936,416 B2     4/2018  Li et al.
(Continued)

FOREIGN PATENT DOCUMENTS

CN          102932849 A       2/2013
CN          103905463 A       7/2014
(Continued)

OTHER PUBLICATIONS

Ford, A., et al., "TCP Extensions for Multipath Operation with Multiple Addresses," RFC 6824, Jan. 2013, 64 pages.

*Primary Examiner* — Julio R Perez
(74) *Attorney, Agent, or Firm* — Conley Rose, P.C.

(57) ABSTRACT

A network switching method includes transmitting, by an electronic device, data using a wireless local area network, when a data transmission delay of the wireless local area network is greater than a first threshold, switching, by the electronic device, to transmitting data using both the wireless local area network and a mobile network, and when the electronic device transmits data using both the wireless local area network and the mobile network, if the data transmission delay of the wireless local area network is greater than a second threshold, switching, by the electronic device, to transmitting data using the mobile network, where the first threshold is less than the second threshold.

20 Claims, 8 Drawing Sheets

(51) Int. Cl.
*H04W 36/30* (2009.01)
*H04W 48/18* (2009.01)
*H04W 88/06* (2009.01)
*H04W 92/02* (2009.01)

(58) Field of Classification Search
CPC ..... H04W 28/08; H04W 36/28; H04W 76/16; H04W 36/00; H04W 36/0066; H04W 36/0083; H04L 1/08
See application file for complete search history.

(56) References Cited

U.S. PATENT DOCUMENTS

| | | | |
|---|---|---|---|
| 10,531,360 B1* | 1/2020 | Govindassamy | H04L 67/322 |
| 11,122,815 B2* | 9/2021 | Jani | A23G 4/18 |
| 2007/0008928 A1* | 1/2007 | Kezys | H04W 36/18 |
| | | | 370/331 |
| 2011/0228749 A1 | 9/2011 | Taghavi Nasrabadi et al. | |
| 2016/0043844 A1 | 2/2016 | Meylan et al. | |
| 2016/0212759 A1 | 7/2016 | Schliwa-Bertling et al. | |
| 2016/0242109 A1 | 8/2016 | Kwak et al. | |
| 2017/0048127 A1* | 2/2017 | Almodovar Chico | H04W 36/0085 |
| 2017/0078921 A1 | 3/2017 | Xia et al. | |
| 2017/0099338 A1 | 4/2017 | Yang et al. | |
| 2017/0302722 A1 | 10/2017 | Porokh et al. | |
| 2018/0077623 A1 | 3/2018 | Sirotkin et al. | |
| 2019/0037433 A1 | 1/2019 | Nagasaka et al. | |
| 2021/0007023 A1* | 1/2021 | Umapathy | H04W 36/0083 |

FOREIGN PATENT DOCUMENTS

| | | |
|---|---|---|
| CN | 104735726 A | 6/2015 |
| CN | 104994036 A | 10/2015 |
| CN | 105101438 A | 11/2015 |
| CN | 105474598 A | 4/2016 |
| CN | 105554831 A | 5/2016 |
| CN | 105915466 A | 8/2016 |
| CN | 106792953 A | 5/2017 |
| CN | 105324966 B | 4/2019 |
| EP | 3179260 A1 | 6/2017 |
| KR | 20120091367 A | 8/2012 |
| WO | 2013169991 A1 | 11/2013 |
| WO | 2014036704 A1 | 3/2014 |
| WO | 2017170164 A1 | 10/2017 |

* cited by examiner

NETWORK SWITCHING METHOD, ELECTRONIC DEVICE, AND SYSTEM ON CHIP

CROSS-REFERENCE TO RELATED APPLICATIONS

This application is a continuation of International Patent Application No. PCT/CN2019/081638, filed on Apr. 6, 2019, which claims priority to Chinese Patent Application No. 201810872929.1, filed on Aug. 2, 2018, both of which are hereby incorporated by reference in their entireties.

TECHNICAL FIELD

Embodiments of the present disclosure relate to the communications field, and more specifically, to a method for data transmission based on a plurality of types of networks, and a related device.

BACKGROUND

With the development of the mobile internet, an electronic device may access a fixed network using a wireless network, such as a WI-FI network and a mobile network, and then perform data transmission with a peer device to obtain various services. Quality of the wireless network has great impact on service experience. However, transmission quality of the wireless network is usually unstable. In order to provide better experience for a user, switching between the WI-FI network and the mobile network can be performed based on a signal strength in other approaches, to ensure better data transmission. For example, when a strength of a WI-FI signal is lower than a particular specified threshold, switching to the mobile network is performed for data transmission. However, when respective signal strengths of the WI-FI network and the mobile network are not good, transmission quality cannot be improved through switching between the WI-FI network and the mobile network, and a "ping-pong effect", namely, frequent switching between the WI-FI network and the mobile network, may occur, increasing power consumption of a device.

SUMMARY

Embodiments of this application provide a network switching method, a system on chip (SOC), and an electronic device, to improve user experience and reduce unnecessary switching overheads in a scenario of transmitting data based on a plurality of types of wireless networks.

To achieve the foregoing objectives of the present disclosure, according to a first aspect, an embodiment of this application provides a network switching method, where the method includes transmitting, by an electronic device, data using a wireless local area network, when a data transmission delay of the wireless local area network is greater than a first threshold, switching, by the electronic device, to transmitting data using both the wireless local area network and a mobile network, and when the electronic device transmits data using both the wireless local area network and the mobile network, if the data transmission delay of the wireless local area network is greater than a second threshold, switching, by the electronic device, to transmitting data using the mobile network, where the first threshold is less than the second threshold.

The data transmission delay may be specifically a round-trip time (RTT) or a jitter parameter of a delay (reflecting a status of delay fluctuation). When the data transmission delay of the wireless local area network is greater than the first threshold, it indicates that a delay of transmitting a data packet of an application using the wireless local area network is lower than a delay threshold of optimal user experience. In this case, on the basis of establishing a mobile network connection, the electronic device switches to transmitting data using both the wireless local area network and the mobile network. Transmitting data using both the wireless local area network and the mobile network means that a data packet is redundantly sent on respective paths of the wireless local area network and the mobile network. A same data packet is transmitted on both paths of the wireless local area network and the mobile network. Different from switching between two states, namely, the mobile network and the wireless local area network when a preset threshold is reached in other approaches, according to the network switching method provided in this embodiment of this application, two thresholds are set for the data transmission delay, to implement switching of three network states the mobile network, the mobile network and the wireless local area network, and the wireless local area network. When the data transmission delay of the wireless local area network gradually increases, and a data transmission effect is poor, switching to a state of transmitting data using both the wireless local area network and the mobile network may be performed, to avoid unnecessary switching overheads caused by poor data transmission quality of both the mobile network and the wireless local area network, and ensure use experience of a user. In addition, when the electronic device transmits data using both the wireless local area network and the mobile network, if data transmission quality of either of the wireless local area network and the mobile network improves, switching to this network may be performed. Such a flexible network switching method can ensure data transmission quality, improve user experience, and reduce unnecessary overheads.

In a possible implementation, the method further includes, when the electronic device transmits data using the mobile network, if it is detected that the data transmission delay of the wireless local area network is greater than the first threshold, and a data transmission delay of the mobile network is greater than the first threshold, switching, by the electronic device, to transmitting data using both the wireless local area network and the mobile network.

In a possible implementation, the method further includes, when the electronic device transmits data using the mobile network, if it is detected that the data transmission delay of the wireless local area network is less than the first threshold, switching, by the electronic device, to transmitting data using the wireless local area network.

In a possible implementation, the method further includes, when the electronic device transmits data using the mobile network, detecting the data transmission delay of the wireless local area network. Specifically, the data transmission delay of the wireless local area network may be periodically detected.

In a possible implementation, after the electronic device switches to transmitting data using both the wireless local area network and the mobile network, when the electronic device transmits data using both the wireless local area network and the mobile network, the method further includes, if the data transmission delay of the wireless local area network is less than the first threshold, switching, by the electronic device, to transmitting data using the wireless local area network.

In a possible implementation, the method further includes, when the electronic device transmits data using both the wireless local area network and the mobile network, if the data transmission delay of the wireless local area network is greater than the second threshold, and a data transmission delay of the mobile network is less than the second threshold, switching, by the electronic device, to transmitting data using the mobile network.

In a possible implementation, when the electronic device transmits data using both the wireless local area network and the mobile network, the method further includes, if the data transmission delay of the wireless local area network is greater than the first threshold and less than the second threshold, and a data transmission delay of the mobile network is less than the first threshold, switching, by the electronic device, to transmitting data using the mobile network.

In a possible implementation, the detecting the data transmission delay of the wireless local area network includes transmitting a probe message using the wireless local area network, receiving a response message corresponding to the probe message, and determining the data transmission delay of the wireless local area network based on a sending time of the probe message and a receiving time of the response message.

In a possible implementation, the data transmitted by the electronic device includes a data packet of a first application, and the data transmission delay is a delay of transmitting the data packet of the first application. The data transmission delay is a delay of transmitting a data packet of each application or each type of application.

In a possible implementation, the first threshold and the second threshold are preconfigured for the first application.

In a possible implementation, the method further includes, when data is transmitted using the mobile network, if it is detected that the data transmission delay of the wireless local area network is greater than the second threshold, and a data transmission delay of the mobile network is greater than the first threshold and less than the second threshold, transmitting, by the electronic device, the data packet of the application still using the mobile network.

In a possible implementation, the method further includes, when data is transmitted using the mobile network, if it is detected that the data transmission delay of the wireless local area network is greater than the first threshold, and a data transmission delay of the mobile network is less than the first threshold, transmitting, by the electronic device, data still using the mobile network.

In a possible implementation, the method further includes, after the terminal switches to transmitting data using both the wireless local area network and the mobile network, when the electronic device transmits data using both the wireless local area network and the mobile network, if the data transmission delay of the wireless local area network is greater than the first threshold, and a data transmission delay of the mobile network is greater than the first threshold, transmitting, by the electronic device, data still using both the wireless local area network and the mobile network.

In a possible implementation, the method further includes, when the electronic device transmits data using the wireless local area network, if the data transmission delay of the wireless local area network is less than the first threshold, transmitting, by the electronic device, data still using the wireless local area network.

In a possible implementation, the transmitted data packet includes a first header, and the first header carries a sending timestamp of the data packet. A data transmission delay of the data packet is a time difference between a receiving timestamp of a response message of the data packet and the sending timestamp of the data packet.

In a possible implementation, the method further includes modifying, by the electronic device, a value of a maximum segment size (MSS), where a modified value of the MSS is less than or equal to a difference between a fragment length limit and a length of the first header.

According to the network switching method provided in this embodiment of this application, a to-be-switched-to network may be selected based on changes of data transmission delays of networks, to switch to the network that can provide better data transmission quality to improve user experience. In addition, setting two thresholds for a same parameter of different applications makes the network switching method more flexible, to better adapt to a change of a network environment.

According to a second aspect, an embodiment of this application provides an electronic device, and the electronic device includes a scheduling module, and a wireless local area network transmission module and a mobile network transmission module that are configured to transmit data, where the scheduling module is configured to, when a data transmission delay of the wireless local area network transmission module is greater than a first threshold, switch to transmitting data using both the wireless local area network transmission module and the mobile network transmission module, and when data is transmitted using both the wireless local area network transmission module and the mobile network transmission module, if the data transmission delay of the wireless local area network transmission module is greater than a second threshold, switch to transmitting data using the mobile network transmission module, where the first threshold is less than the second threshold.

In a possible implementation, the scheduling module is further configured to, when data is transmitted using the mobile network transmission module, if it is detected that the data transmission delay of the wireless local area network transmission module is greater than the first threshold, and a data transmission delay of the mobile network transmission module is greater than the first threshold, switch to transmitting data using both the wireless local area network transmission module and the mobile network transmission module.

In a possible implementation, the scheduling module is further configured to, when data is transmitted using the mobile network transmission module, if it is detected that the data transmission delay of the wireless local area network transmission module is less than the first threshold, switch to transmitting data using the wireless local area network transmission module.

In a possible implementation, the scheduling module is further configured to, when data is transmitted using the mobile network transmission module, detect the data transmission delay of the wireless local area network transmission module.

In a possible implementation, the scheduling module is configured to, when data is transmitted using both the wireless local area network transmission module and the mobile network transmission module, if the data transmission delay of the wireless local area network transmission module is less than the first threshold, switch to transmitting data using the wireless local area network transmission module.

In a possible implementation, the scheduling module is configured to, when data is transmitted using both the wireless local area network transmission module and the mobile network transmission module, if the data transmission delay of the wireless local area network transmission module is greater than the second threshold, and a data transmission delay of the mobile network transmission module is less than the second threshold, switch to transmitting data using the mobile network transmission module.

In a possible implementation, the scheduling module is configured to, when data is transmitted using both the wireless local area network transmission module and the mobile network transmission module, if the data transmission delay of the wireless local area network transmission module is greater than the first threshold and less than the second threshold, and a data transmission delay of the mobile network transmission module is less than the first threshold, switch to transmitting data using the mobile network transmission module.

In a possible implementation, the wireless local area network transmission module is further configured to receive a response message corresponding to a probe message, and the scheduling module is further configured to transmit the probe message using the wireless local area network transmission module, and determine the data transmission delay of the wireless local area network based on a sending time of the probe message and a receiving time of the response message.

In a possible implementation, the transmitted data includes a data packet of a first application, and the data transmission delay is a delay of transmitting the data packet of the first application.

In a possible implementation, the first threshold and the second threshold are preconfigured for the first application.

According to a third aspect, an embodiment of this application provides a SOC, and the SOC includes an application processor, and a modem and a WI-FI module that are configured to transmit data, where the application processor is configured to, when a data transmission delay of the WI-FI module is greater than a first threshold, switch to transmitting data using both the WI-FI module and the modem, and when data is transmitted using both the WI-FI module and the modem, if the data transmission delay of the WI-FI module is greater than a second threshold, switch to transmitting data using the modem, where the first threshold is less than the second threshold.

In a possible implementation, the application processor is further configured to, when data is transmitted using the modem, if it is detected that the data transmission delay of the WI-FI module is greater than the first threshold, and a data transmission delay of the modem is greater than the first threshold, switch to transmitting data using both the WI-FI module and the modem.

In a possible implementation, the application processor is further configured to, when data is transmitted using the modem, if it is detected that the data transmission delay of the WI-FI module is less than the first threshold, switch to transmitting data using the WI-FI module.

In a possible implementation, the application processor is further configured to, when data is transmitted using the modem, detect the data transmission delay of the WI-FI module.

In a possible implementation, the application processor is further configured to, when data is transmitted using both the WI-FI module and the modem, if the data transmission delay of the WI-FI module is less than the first threshold, switch to transmitting data using the WI-FI module.

In a possible implementation, the application processor is further configured to, when data is transmitted using both the WI-FI module and the modem, if the data transmission delay of the WI-FI module is greater than the second threshold, and a data transmission delay of the modem is less than the second threshold, switch to transmitting data using the modem.

In a possible implementation, the application processor is further configured to, when data is transmitted using both the WI-FI module and the modem, if the data transmission delay of the WI-FI module is greater than the first threshold and less than the second threshold, and a data transmission delay of the modem is less than the first threshold, switch to transmitting data using the modem.

In a possible implementation, the WI-FI module is further configured to receive a response message corresponding to the probe message, and the application processor is further configured to transmit the probe message using the WI-FI module, and determine the data transmission delay of the wireless local area network based on a sending time of the probe message and a receiving time of the response message.

In a possible implementation, the transmitted data includes a data packet of a first application, and the data transmission delay is a delay of transmitting the data packet of the first application.

In a possible implementation, the first threshold and the second threshold are preconfigured for the first application.

According to a fourth aspect, an embodiment of this application provides an electronic device, including the SOC according to any one of the third aspect and the possible implementations of the third aspect.

According to a fifth aspect, an embodiment of this application provides an electronic device, and the electronic device includes a processor and a computer readable storage medium that stores a computer program. The processor is coupled to the computer readable storage medium. When the computer program is executed by the processor, the network switching method according to any one of the first aspect and the possible implementations of the first aspect is implemented.

According to a sixth aspect, an embodiment of this application provides a computer readable storage medium, where a computer program is stored in the computer readable storage medium. When the computer program is executed by a processor, the network switching method according to any one of the first aspect and the possible implementations of the first aspect is implemented.

According to a seventh aspect, an embodiment of this application provides a computer program product, including a computer program. When the computer program is executed by a processor, the network switching method according to any one of the first aspect and the possible implementations of the first aspect is implemented.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure.

Terms "first" and "second" in this application are used to distinguish objects of a same type, but cannot be understood as an indication or implication of relative importance, or an implicit indication of a quantity of indicated technical features. Therefore, a feature limited by "first" or "second" may explicitly or implicitly include one or more features. In the description of the embodiments of the present disclosure, unless stated otherwise, "a plurality of" means two or more than two.

Before the specific embodiments of this application are described, the terms and their meanings mentioned in the following embodiments of this application are first described. It may be understood that, unless stated otherwise, these terms and their meanings in the embodiments of this application may be the same.

Data packet. It is also referred to as a packet, is a basic unit for network transmission, and is data organized in a particular format. Different types of network protocols have different definitions for a format of a data packet. However, a data packet usually includes a header and a payload. The header includes necessary information in a process of data packet transmission, for example, address information and a flag bit. The payload is also referred to as a data part of the data packet, including sent data content.

Control packet. It is also referred to as a probe message, and is a special data packet that is used to measure a data transmission delay. Usually, a control packet does not include application data.

Acknowledgement (ACK). It is a transmission-type control character that is returned to a transmit end after a receive end receives a data packet sent by the transmit end in a process of data transmission, and indicates that the data packet sent by the transmit end is correctly received.

RTT. It is an important performance indicator in network transmission, and indicates total duration from a time when a transmit end sends data to a time when the transmit end receives an ACK from a receive end.

Packet loss rate. It is a ratio of a quantity of data packets lost during transmission to a quantity of sent data packets. Packet loss means that one or more data packets (packet) cannot reach a destination through a network. Packet loss may cause jittering in streaming technologies, online games, and video conferences, and may affect other network applications to some extent.

Figure 1:
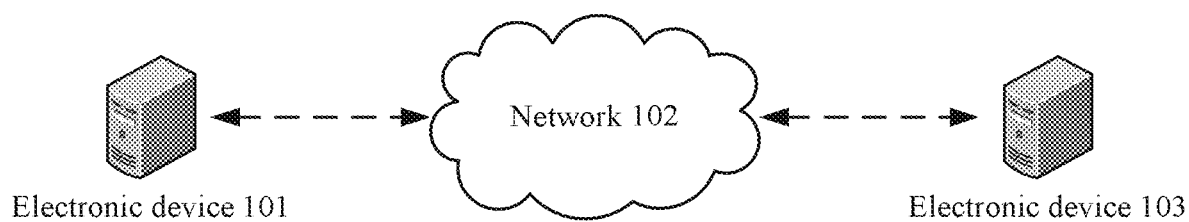
FIG. 1 is a schematic diagram of a communications system according to an embodiment of the present disclosure.

FIG. 1 is a system for data transmission between electronic devices applicable to this application. It should be noted that the system in FIG. 1 is merely an example of a possible system, and the disclosed implementation solutions can be implemented in any one of various systems as required.

As shown in FIG. 1, the system includes an electronic device 101, a network 102, and an electronic device 103. The electronic device 101 and the electronic device 103 are communicatively connected using the network 102. The network 102 may be a wireless local area network or a mobile network. A communication connection is established between the electronic devices 101 and 103 based on a specific communication protocol, and then based on the established connection, a data packet is used as a unit for data transmission. A data packet may pass through one or more network devices, such as an access network device, a routing device, or an access point (AP), in the network 102 during transmission.

The electronic device 101 may be a terminal device, and may be specifically any one of various types of computer systems or devices that are mobile or portable and that perform wireless communication. For example, the electronic device may include a mobile phone or a smartphone (such as iPhone™ or an Android™-based phone), a portable gaming device (such as Nintendo DS™, PlayStation Portable™, Gameboy Advance™, or iPhone™), a laptop, a personal digital assistant (PDA), a portable internet device, a music player, a data storage device, another handheld device, and a wearable device such as a watch, a headset, a pendant, or an earphone. The electronic device 103 may be a terminal device or a server, and may be specifically an agent server or another server communicatively connected to the agent server.

Figure 2:
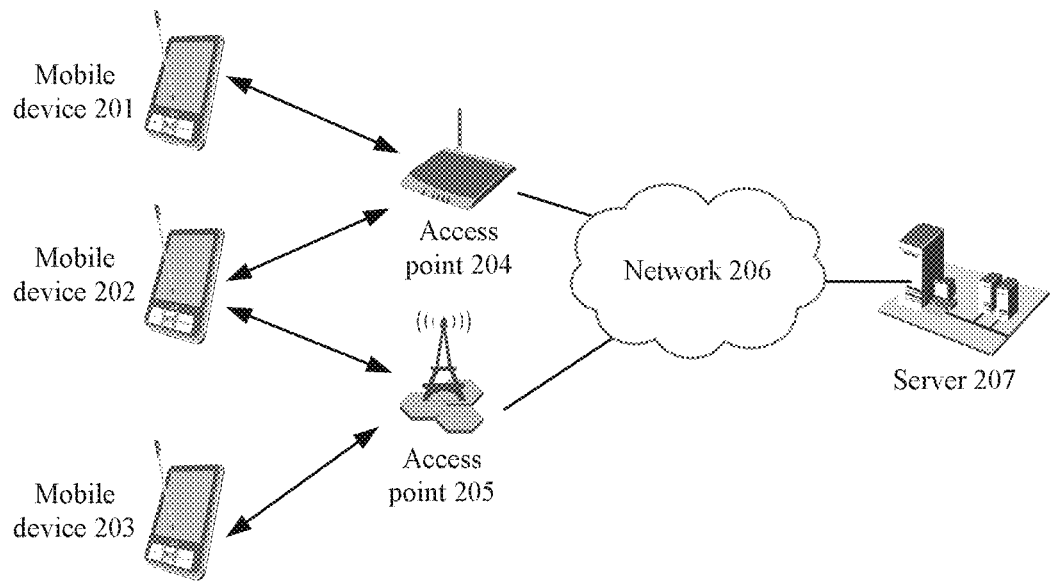
FIG. 2 is a schematic diagram of a communications system according to an embodiment of the present disclosure.

FIG. 2 shows a specific implementation of the communications system described in FIG. 1.

As shown in FIG. 2, the system includes a mobile device 201, a mobile device 202, and an access point 204. The access point 204 may be an access point of a wireless local area network, for example, a WI-FI access point 204. The mobile device 201 and the mobile device 202 may access a network 206 using the access point 204 in order to implement a communication connection to a server 207. The network 206 is a fixed network or a backbone network. A wireless link between the mobile device 201 and/or the mobile device 202 and the WI-FI access point 204 forms a wireless local area network.

In this system, an access point 205 may implement a communication connection to the mobile device 202 and the mobile device 203. Specifically, the access point 205 is a mobile network access point, for example, a base station 205. The mobile device 202 and the mobile device 203 may access the network 206 using one or more base stations 205 in order to implement a communication connection to the server 207. A wireless link between the mobile device 203 and/or the mobile device 202 and the access point 205 forms a mobile network, which is also referred to as a cellular network. The mobile network performs communication based on a manner defined by any one of various mobile communication specifications, such as global system for mobile communications (GSM), wideband code division multiple access (WCDMA), time division-synchronous code division multiple access (TD-SCDMA), and long term evolution (LTE).

In this system, mobile devices 201 to 203 may be alternatively connected using a BLUETOOTH or WI-FI direct connection manner to perform data transmission.

A person skilled in the art can understand that a data transmission architecture may usually include fewer or more components than those shown in FIG. 2, or include components that are different from those shown in FIG. 2, and FIG. 2 merely shows the components that are more closely related to a plurality of implementations disclosed in this embodiment of this application.

The mobile device 202 that communicates with both the WI-FI access point 204 and the base station 205 is an example of an electronic device 300 having a communication capability through a mobile network and having a communication capability through a wireless local area network.

The electronic device 300 may be configured to perform communication using any one of a plurality of wireless communication protocols. For example, the electronic device 300 may be configured to perform communication using any one of various cellular mobile communication technologies, such as GSM, WCDMA, and LTE. The electronic device 300 may be further configured to perform communication using any one of various wireless local area network communication technologies, such as WI-FI. It is also possible that another combination of wireless communication technologies is used.

Figure 3:
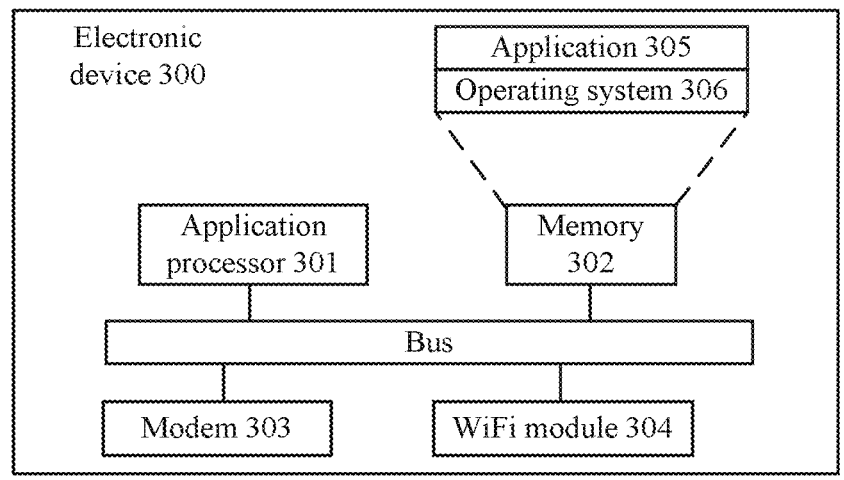
FIG. 3 is a schematic structural diagram of an electronic device according to an embodiment of the present disclosure.

FIG. 3 is a schematic structural diagram of an electronic device 300. The electronic device 300 includes components, such as a processor 301 (which may be specifically an application processor 301 in an embodiment of this application), a memory 302, and communications modules, such as a modem 303 (which, for example, is used for LTE, GSM, and the like) and a WI-FI module 304 (for example, a wireless local access network (WLAN) circuit). A person skilled in the art may understand that the electronic device 300 may include more or fewer components than those shown in the figure, or a combination of particular components. These components can perform communication using one or more buses or signal cables. The bus may be an address bus, a data bus, a control bus, or the like.

As described in this specification, the electronic device 300 may include hardware and software components configured to implement the methods described in this application. The processor 301 of the electronic device 300 may be configured to implement some or all of the methods described in this application, for example, by executing a program instruction stored on the memory (for example, a non-volatile computer readable storage medium). Optionally, the processor 301 can be configured as a programmable circuit unit, such as a field-programmable gate array (FPGA) or as an application-specific integrated circuit (ASIC). Optionally, in combination with one or more of other components, the processor 301 of the electronic device 300 may be configured to implement some or all of the methods described in this application.

The processor 301 may be a central processing unit (CPU), a network processor (NP), or a combination of a CPU and an NP. The processor 301 may further include a hardware chip. The hardware chip may be an ASIC, a programmable logic device (PLD), or a combination thereof. The PLD may be a complex programmable logic device (CPLD), a FPGA, a generic array logic (GAL), or any combination thereof.

The memory 302 is configured to store computer programs, such as an application 305 and an operating system 306 shown in FIG. 3. The processor 301 may invoke the computer programs stored by the memory 302, to implement functions defined by the computer programs. For example, the processor 301 executes the operating system to implement various functions of the operating system on the electronic device 300. The operating system 306 may be Linux®, Windows®, or another operating system, and this is not limited in this embodiment of this application.

The memory 302 further stores data other than the computer programs, such as data generated during operating of the operating system 306 and the application 305. The memory 302 may include a volatile memory, for example, a random-access memory (RAM). The memory 302 may also include a non-volatile memory, for example, a flash memory, a hard disk drive (HDD), or a solid-state drive (SSD). The memory 302 may further include a combination of the foregoing memories. FIG. 3 shows only one memory. Certainly, a plurality of storage devices may be arranged as the memory 302 according to a requirement. The memory 302 may be alternatively a memory in the processor 301, and this is not limited herein.

The communications module, or referred to as a communications interface, is configured to enable the electronic device 300 to implement a communication connection to another electronic device and allow the electronic device 300 to perform communication over a network, and can implement sending and receiving of a data packet. The communications interface includes the modem 303 configured to provide a function of communication using a mobile network for the electronic device 300, and the WI-FI module 304 configured to provide a function of communication using a wireless local area network for the electronic device 300. A processor and a memory (including a RAM and a read-only memory (ROM)) may be integrated in the modem 303.

Figure 4:
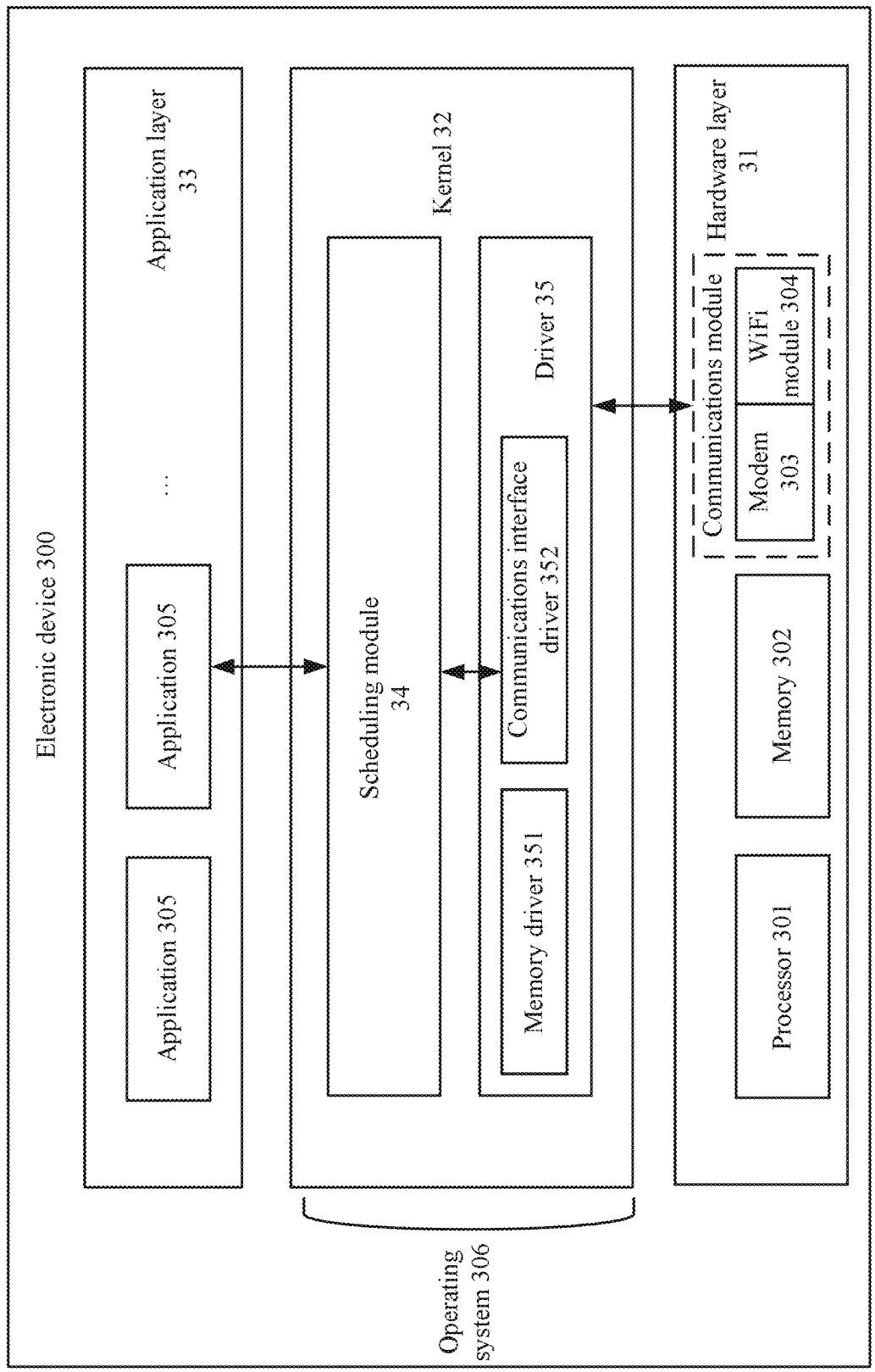
FIG. 4 is a schematic structural diagram of an electronic device according to an embodiment of the present disclosure.

Further, in an embodiment, as shown in FIG. 4, the electronic device 300 may be logically divided into a hardware layer 31, an operating system 306, and an application layer 33. The hardware layer 31 includes hardware resources such as the processor 301, the memory 302, and the communications modules (for example, the modem 303 and the WI-FI module 304) described above. The application layer 33 includes one or more applications, such as an application 305. The operating system 306, as a software middleware between the hardware layer 31 and the application layer 33, is a computer program that manages and controls hardware and software resources.

The operating system 306 includes a kernel 32. The kernel 32 is configured to provide underlying system components and services, such as power management, memory management, a scheduling module 34, and a driver 35. The scheduling module 34 is a component for implementing network switching. After the application 305 delivers a data sending instruction, data passes through the scheduling module 34, and is sent by invoking the communications module by the driver 35. In an embodiment, the driver 35 includes a memory driver 351 and a communications interface driver 352 (configured to drive the communications module). The network switching method provided in this embodiment of this application may be implemented by the scheduling module 34 in the kernel 32. The scheduling module 34 may be implemented in a user mode process. Alternatively, an existing protocol stack may be extended, and the scheduling module 34 may be implemented in a kernel mode based on the existing protocol stack.

Figure 5:
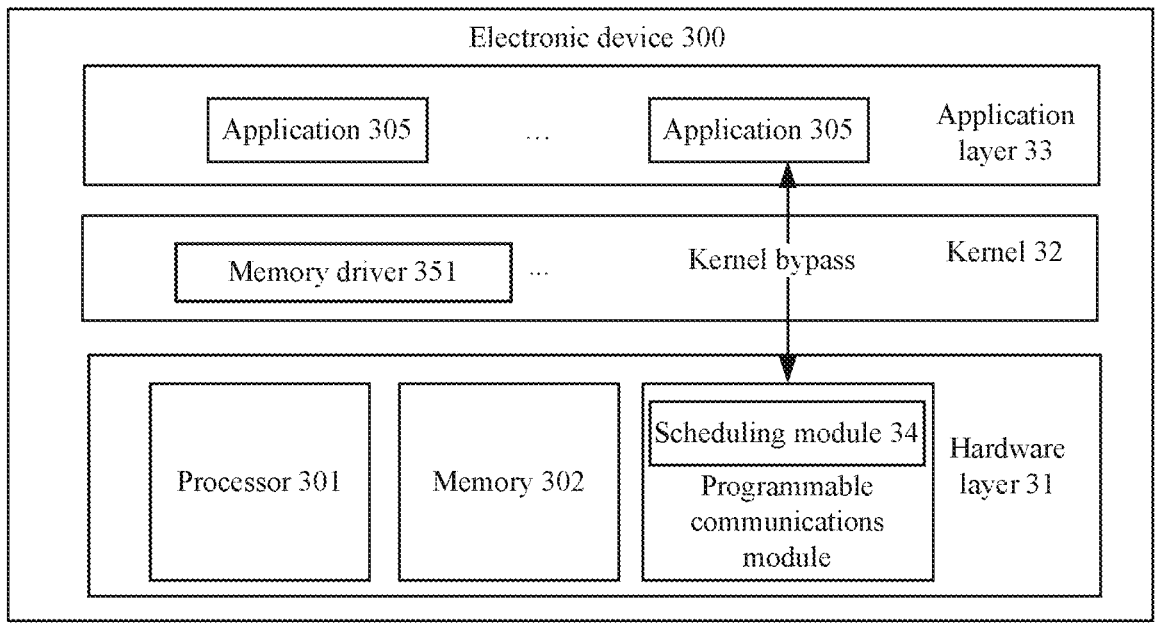
FIG. 5 is a schematic structural diagram of an electronic device according to an embodiment of the present disclosure.

In an embodiment, the electronic device 300 may move functions of the scheduling module 34 to the communications module of the hardware layer 31, to implement a kernel bypass and improve data forwarding performance. As shown in FIG. 5, the communications module is a programmable circuit unit, and the scheduling module 34 is implemented in a programmable communications module. Correspondingly, the network switching method provided in this embodiment of this application may be implemented by the communications module. Specifically, the method may be implemented by modifying hardware or firmware of the communications module. The computer program may be stored in a memory integrated in the programmable communications module, and a processor integrated in the programmable communications module executes the computer program to implement the network switching method provided in this application. Alternatively, the network switching method provided in this application may be implemented using a logic circuit in the programmable communications module.

Figure 6:
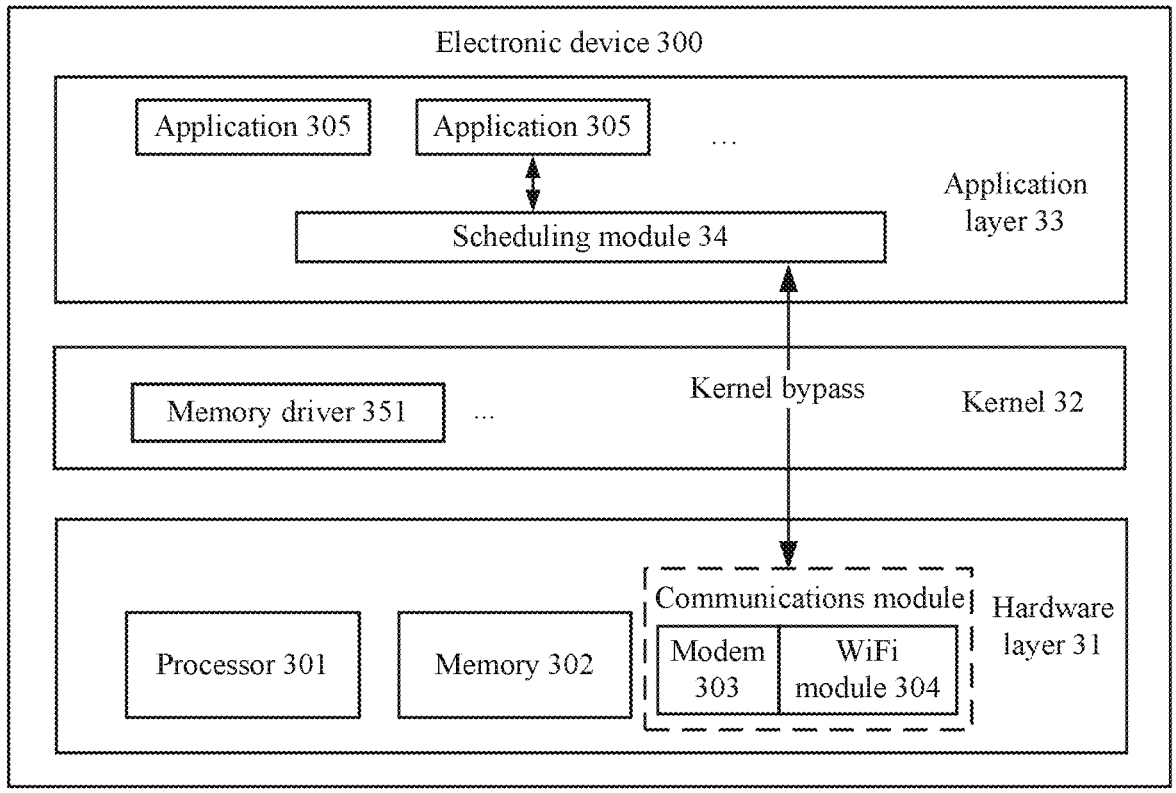
FIG. 6 is a schematic structural diagram of an electronic device according to an embodiment of the present disclosure.

In an embodiment, as shown in FIG. 6, the electronic device 300 may implement the scheduling module 34 in the application layer 33 (for example, using a data plane development kit (DPDK) technology), to implement a kernel bypass and improve data forwarding performance. Correspondingly, the network switching method provided in this embodiment of this application may be implemented by software of the application layer 33.

For ease of description, one of two electronic devices, between which a communication connection is established, is referred to as a transmit end, and the other is referred to as a receive end in this embodiment of this application. It should be understood that the transmit end and the receive end may be any electronic devices that have data sending and receiving capabilities. In addition, the transmit end and the receive end are two relative roles and can be interchanged, that is, a same device may be a transmit end or a receive end depending on a scenario.

Figure 7:
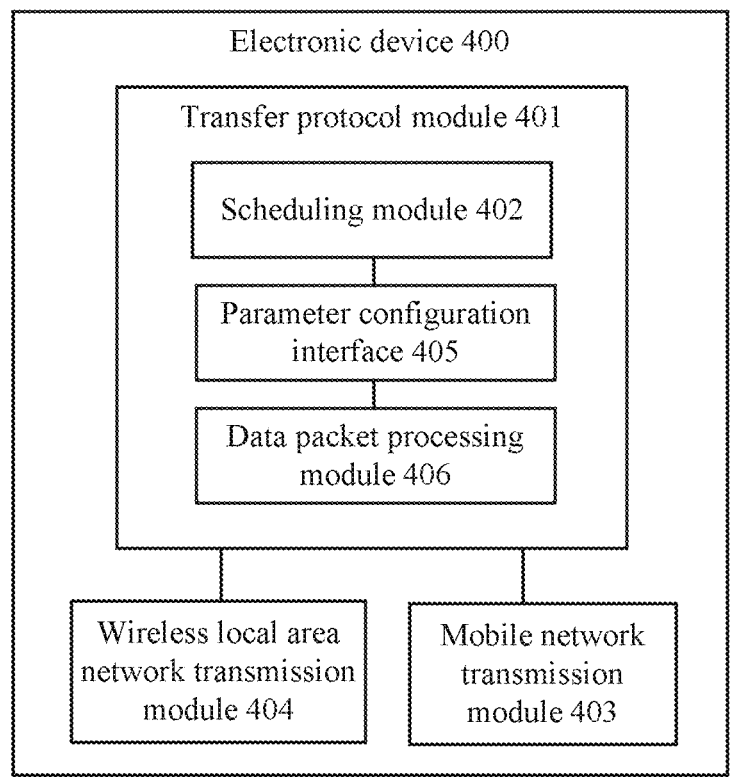
FIG. 7 is a schematic structural diagram of an electronic device according to an embodiment of the present disclosure.

FIG. 7 is another schematic structural diagram of an electronic device for implementing the network switching method in this application. The electronic device 400 may include a transfer protocol module 401, a mobile network transmission module 403, and a wireless local area network transmission module 404, and may further include a flow steering module (not shown in FIG. 7). The electronic device 400 may include some or all of the components of the foregoing electronic device 300.

The flow steering module is configured to set a label for data delivered by an application. Specifically, a label may be set for a data packet delivered by a particular application, such as a game application or a video application, a label may also be set for a particular protocol type, for example, a label is set for a delivered Transmission Control Protocol (TCP) packet or a user datagram protocol (UDP) packet, and a label may also be set for a destination address to which data is sent, where the destination address is an Internet Protocol (IP) address or a port of a destination device to which a data packet is sent. For example, a label may be set for a data packet using iptable.

The flow steering module may also configure a routing rule, and the routing rule indicates a destination to which a data packet is steered. The flow steering module steers, according to the routing rule to the transfer protocol module 401, a data packet that carries a label and that is delivered by an application. The data packet is transmitted using a network selected by the transfer protocol module 401, and the data packet is sent by a transceiver unit using the selected network. Specifically, for a TCP/IP model, the data packet steered by the flow steering module may be a packet processed by an IP layer.

Optionally, the flow steering module may first steer, to an intermediate storage device, the data packet delivered by the application, and then steer the data packet to the transfer protocol module. The intermediate storage device is a process, for example, a network tunnel (TUN) device or a Netfilter device.

The transfer protocol module 401 may include a scheduling module 402 and a parameter configuration interface 405. The scheduling module 402 may include a part or all of the foregoing scheduling module 34.

The parameter configuration interface 405 is configured to set a preset network switching condition for an application. The preset condition is specifically a threshold of a service quality parameter, and the service quality parameter may include at least one of a delay, a throughput, or a packet loss rate. When the preset condition is reached, the scheduling module 402 selects one or more networks from available networks for data packet transmission. A specific threshold of the service quality parameter is related to user experience of an application. Specifically, the specific threshold of the service quality parameter may be configured using the following data structure.

TABLE 1

| Data structure of a service quality parameter | |
| --- | --- |
| User identity (UID) | threshold_high threshold_low |

Figure 8:
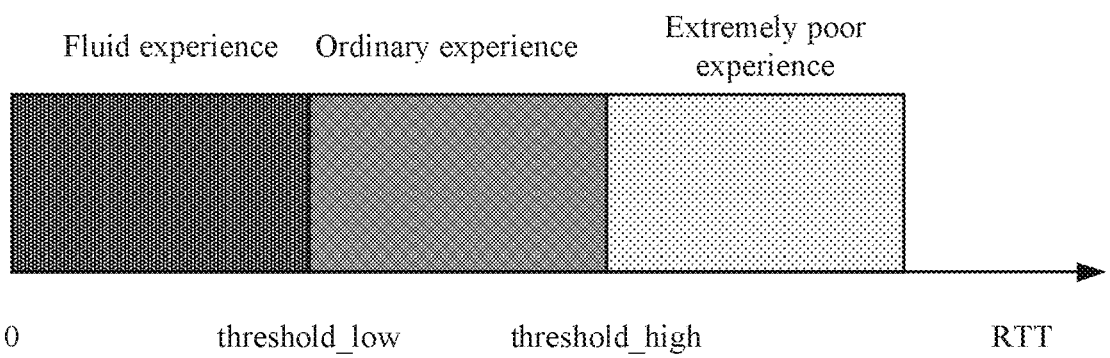
FIG. 8 is a schematic diagram of thresholds of a delay according to an embodiment of the present disclosure.

Each UID may correspond to one application. In an embodiment, thresholds of a service quality parameter are set for each application. Specifically, two or more thresholds may be set for one service quality parameter of an application. Herein, threshold_low is a threshold of a service quality parameter for optimal experience, which may be referred to as a first threshold, and threshold_high is a threshold of a service quality parameter reaching a standard, which may be referred to as a second threshold. These two user experience-related thresholds may be obtained by an application development vendor through service logic statistics collection and analysis based on a large quantity of user behavior, and are delivered and updated using the parameter configuration interface 405 as required. Different types of applications have different indicators for thresholds of service quality that satisfy user experience. Using the delay as an example, optimal experience of a game application may require a delay threshold of 100 milliseconds (ms), and a delay threshold reaching a standard may be 200 ms. In this case, a second threshold of a delay of the game application may be set to 200 ms, and a first threshold may be set to 100 ms. Optimal experience of an instant messaging application may require a delay threshold of 700 ms, and a delay threshold reaching a standard may be 1000 ms. In this case, a second threshold of a delay of the instant messaging application may be set to 1000 ms, and a first threshold may be set to 700 ms. As shown in FIG. 8, using the delay as an example, a delay value less than or equal to the value of the first threshold is a delay value that satisfies fluid user experience, and a delay value greater than or equal to the value of the second threshold is a delay value causing extremely poor user experience.

The scheduling module 402 is configured to select a transmission module for data transmission, or select a network for data transmission, for example, select a mobile network (which may also be referred to as a mobile network) for data packet transmission, or select a wireless local area network (for example, WI-FI) for data packet transmission, or select both a mobile network and a wireless local area network for data packet transmission. Specifically, the scheduling module 402 may further detect service quality of data transmission, and switch between networks based on a service quality parameter of data transmission. The scheduling module 402 is configured to perform the network switching method provided in this embodiment of this application, and the method specifically includes steps 102 to 104. Specifically, the scheduling module 402 may be a programmable circuit unit, such as the foregoing application processor.

A data packet processing module 406 is configured to process a data packet, and then a processed data packet is sent to a receive end using the mobile network transmission module 403.

The mobile network transmission module 403 and the wireless local area network transmission module 404 are configured to transmit data, and the transmitted data is a data packet delivered by an application. The mobile network transmission module 403 is configured to transmit data using the mobile network, and specifically, the mobile network transmission module 403 may be the modem 303 in the foregoing electronic device 300. The wireless local area network transmission module 404 transmits data using the wireless local area network, and specifically, the wireless local area network transmission module 404 may be the WI-FI module 304 in the foregoing electronic device 300.

Optionally, the transfer protocol module 401 further includes a data packet processing module 406. The data packet processing module 406 is configured to process a data packet. Specifically, the data packet processing module 406 encapsulates a data packet layer by layer, and a processed data packet is transmitted using at least one of the mobile network transmission module 403 and the wireless local area network transmission module 404.

In another embodiment, a data packet delivered by an application may alternatively be obtained using a virtual private network (VPN) device, and then the data packet is steered to the transfer protocol module 401.

In another embodiment, a protocol interface may be extended for direct invoking by an application, and the transfer protocol module 401 may directly obtain a delivered data packet from the application using the interface.

Figure 9:
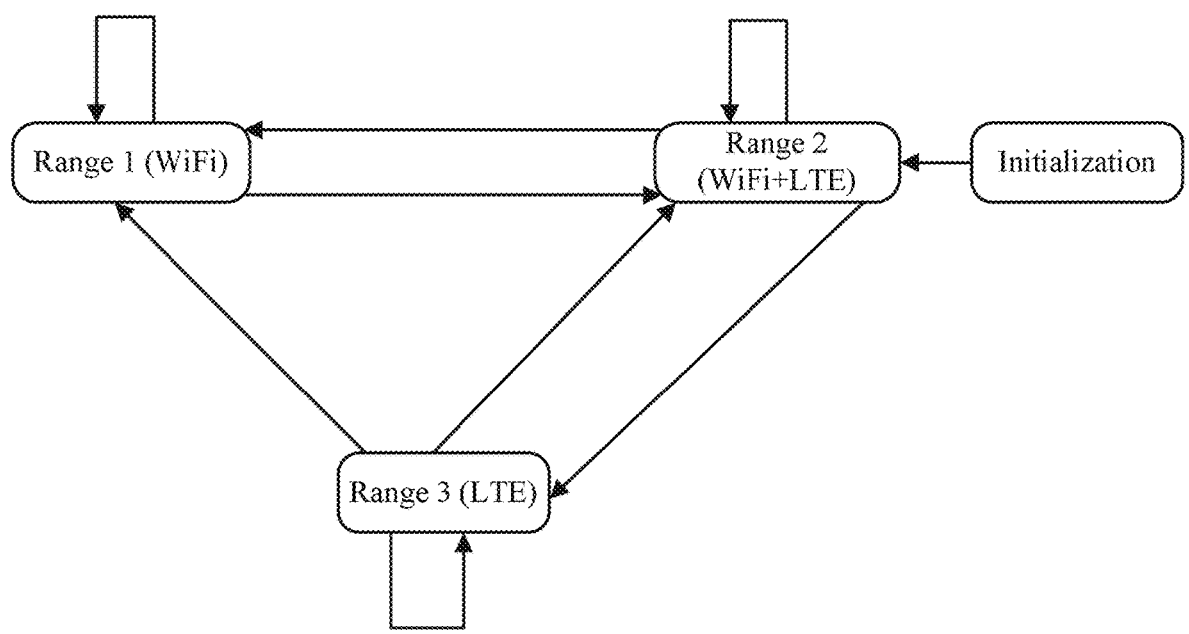
FIG. 9 is a schematic diagram of state switching according to an embodiment of the present disclosure.

The network switching method provided in this embodiment of this application is switching between three states, and the switching means switching between different data transmission states of an electronic device, for example, switching from transmitting data using a wireless local area network to transmitting data using a mobile network. The switching may be specifically related to the following. An electronic device delivers a switching request, and network switching is implemented using a control protocol stack. A schematic diagram of state switching is shown in FIG. 9, and the state switching includes transmitting data using a wireless local area network (for example, Range 1 in FIG. 9), transmitting data using a mobile network (for example, Range 3 in FIG. 9), and transmitting data using both the wireless local area network and the mobile network (for example, Range 2 in FIG. 9), where the transmitted data includes a data packet of an application. Specifically, an initial state can be preset as one of the foregoing three states.

Optionally, transmitting data using both the wireless local area network and the mobile network may be selected as the initial state.

According to the network switching method provided in this application, two thresholds, namely, the first threshold and the second threshold, are preset for a same service quality parameter (for example, a delay) of an application or a type of application. The first threshold and the second threshold may be preconfigured for each application or each type of application. The first threshold is a preset threshold threshold_low of optimal user experience corresponding to the application, and the second threshold is a preset threshold threshold_high of extremely poor user experience corresponding to the application, where the first threshold is less than the second threshold.

Optionally, comparison between a service quality parameter of a network (for example, a delay, which may also be referred to as a data transmission delay) and two specified thresholds shown in FIG. 8, namely, threshold_high (the second threshold) and/or threshold_low (the first threshold), may be made to determine a switched-to state, or a switched-to network or switched-to networks for data transmission.

(1) If a currently measured service quality parameter is poorer than the optimal experience threshold threshold_low, it indicates that service quality that can be provided by a current network may not satisfy optimal user experience. In order to ensure user experience, a transmit end starts to send a data packet over another network at the same time, that is, a data packet is redundantly sent using a plurality of paths to ensure data packet transmission, thereby maintaining relatively good user experience. (2) If a currently measured service quality parameter is poorer than the extremely poor experience threshold threshold_high, data packet sending over a current network is stopped, and switching to another network is performed for data packet transmission. Further, real-time detection of service quality of a network used before the switching may be enabled such that switching to a network that can ensure user experience may be performed based on real-time service quality of two networks.

It should be understood that more thresholds may be set, and switching to a corresponding network may be performed based on a threshold range to which a current network service quality parameter belongs.

Figure 10:
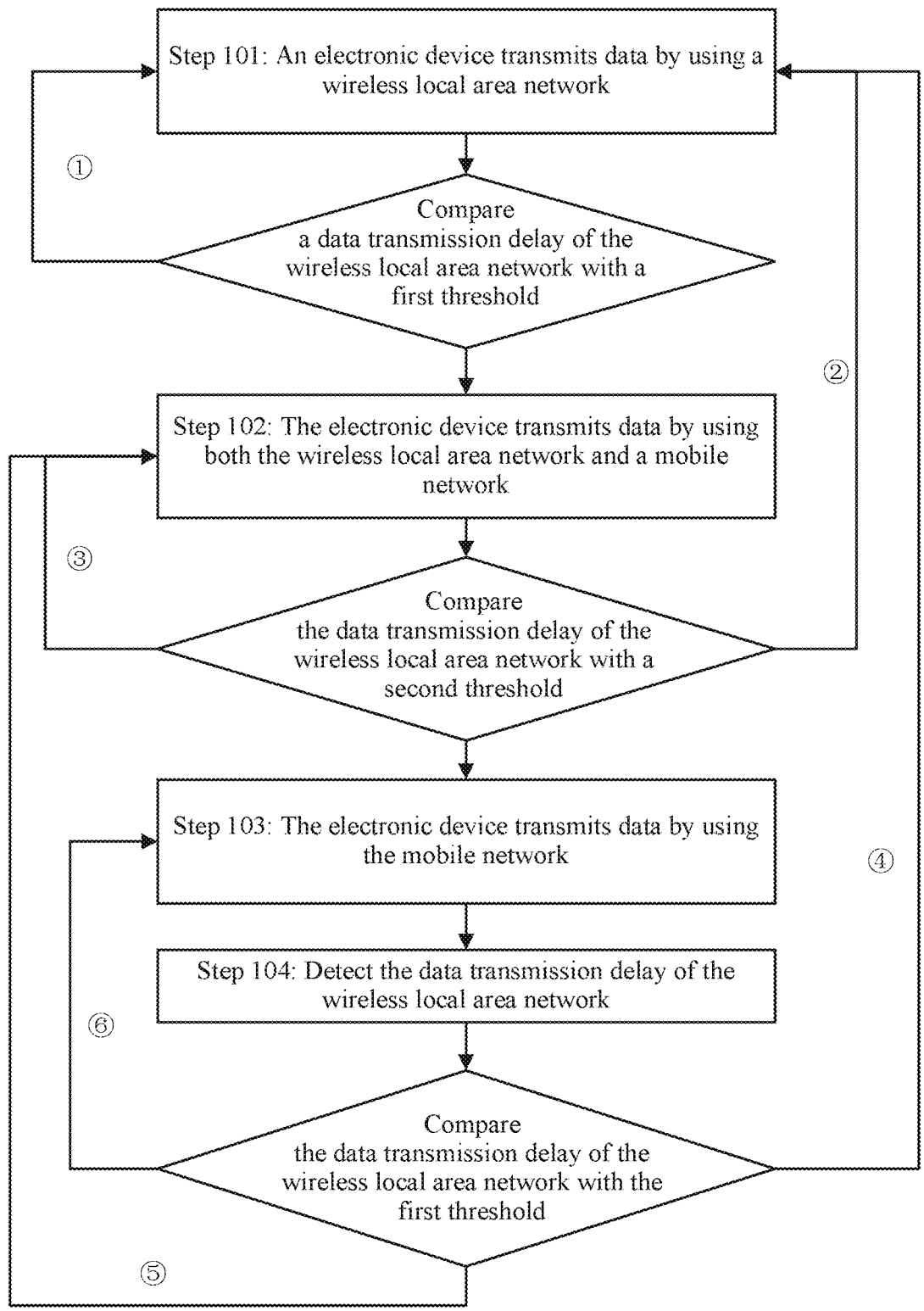
FIG. 10 is a flowchart of a network switching method according to an embodiment of the present disclosure.

The following describes in detail a specific procedure of a network switching method provided in this application, and a flowchart is shown in FIG. 10. This method includes the following steps.

Step 101. An electronic device transmits data using a wireless local area network.

The electronic device accesses an access point of the wireless local area network, and transmits a data packet of an application using the wireless local area network. For example, a terminal accesses an access point of a WI-FI network, and transmits data using the WI-FI network.

Optionally, the electronic device periodically detects a data transmission delay of the wireless local area network, and compares the data transmission delay of the wireless local area network with a first threshold. In a process of data packet transmission, for example, transmission from the electronic device to an application server, the transmission is usually performed using a wireless network and a fixed network. A transmission delay of the fixed network is relatively fixed, and the wireless network is a main factor causing fluctuation of an end-to-end transmission delay of a data packet. A larger data transmission delay in the wireless network indicates a larger end-to-end transmission delay, and a smaller data transmission delay in the wireless network indicates a smaller end-to-end transmission delay. Therefore, in an embodiment, in order to facilitate measurement, an end-to-end data transmission delay of transmitting a data packet of an application by the electronic device using a wireless local area network can be simply equivalent to the data transmission delay of the wireless local area network.

In an embodiment, a data transmission delay is a time consumed from a time when a transmit end (for example, the electronic device) sends a data packet to a time when a receive end (for example, the application server) receives the data packet. In another embodiment, a data transmission delay may be alternatively an RTT, namely, a time consumed from a time when a transmit end sends a data packet to a time when the transmit end receives an acknowledgement for the data packet. The data transmission delay is usually a measurement value or an estimation value. For example, when data is transmitted using the wireless local area network, a time consumed from a time when a data packet is sent to a time when an acknowledgement corresponding to the data packet is received may be measured, and the time may be used as the data transmission delay of the wireless local area network. Optionally, transmission delays of a plurality of data packets within a period of time may be recorded, and the data transmission delay of the wireless local area network may be obtained by averaging the transmission delays of the plurality of data packets or by performing an operation on the transmission delays of the plurality of data packets using a particular algorithm.

Step 102. When the data transmission delay of the wireless local area network is greater than the first threshold, the electronic device switches to transmitting data using both the wireless local area network and a mobile network.

The data transmitted by the electronic device and mentioned in this embodiment of this application includes a data packet of an application. Therefore, the data transmission delay is an end-to-end delay of transmitting the data packet of the application, for example, an RTT.

When the data transmission delay of the wireless local area network is greater than the first threshold, it indicates that a delay of transmitting a data packet of an application using the wireless local area network is lower than a delay threshold of optimal user experience. In this case, on the basis of establishing a mobile network connection, the electronic device switches to transmitting data using both the wireless local area network and the mobile network. In other words, the data packet of the application is redundantly sent on respective paths of the wireless local area network and the mobile network. Specifically, redundant transmission of the data packet of the application can be implemented on the respective paths of the wireless local area network and the mobile network by establishing multi-path transmission between the transmit end and the receive end.

Optionally, when the electronic device transmits data using both the wireless local area network and the mobile network, the data transmission delay of the wireless local area network is periodically detected, and the data transmission delay of wireless local area network is compared with a second threshold. Specifically, the data transmission delay of the wireless local area network is obtained by calculating a delay of transmitting a data packet of an application using the wireless local area network.

In another embodiment, as shown by ① in FIG. 10, when the data transmission delay of the wireless local area network is less than or equal to the first threshold, the electronic device transmits data still using the wireless local area network, and then step 101 is performed.

Step 103. When the electronic device transmits data using both the wireless local area network and the mobile network, if the data transmission delay of the wireless local area network is greater than the second threshold, the electronic device switches to transmitting the data packet of the application using the mobile network, where the first threshold is less than the second threshold.

When the data transmission delay of the wireless local area network is greater than the second threshold, it indicates that a delay of a network link provided by the wireless local area network is further increased to a certain extent, and service quality of the wireless local area network is further reduced. In this case, the wireless local area network cannot ensure quite good user experience, and unnecessary overheads are caused due to data transmission using both the wireless local area network and the mobile network, namely, in such a manner of multi-path redundant transmission of a data packet. Therefore, the electronic device switches to transmitting data only using the mobile network, that is, the data packet of the application is transmitted only using the mobile network.

Optionally, a data transmission delay of the mobile network may also be detected, and the data transmission delay of the mobile network is obtained by calculating a delay of transmitting a data packet of an application using the mobile network. It should be noted that, similar to the data transmission delay of the wireless local area network, the data transmission delay of the mobile network also means an end-to-end delay of transmitting a data packet of an application using the mobile network.

Optionally, if the data transmission delay of the wireless local area network is greater than the second threshold, and the data transmission delay of the mobile network is less than or equal to the second threshold, service quality of the wireless local area network is reduced to the foregoing extremely poor user experience, and service quality of an LTE network is not reduced to the extremely poor user experience. The service quality of the LTE network is better than service quality of the WI-FI network. In this case, the electronic device switches to transmitting data using the mobile network.

Optionally, if the data transmission delay of the wireless local area network is greater than the first threshold and less than the second threshold, and the data transmission delay of the mobile network is less than the first threshold, it indicates that the wireless local area network cannot provide the foregoing optimal user experience, and the mobile network can provide the foregoing optimal user experience. In this case, the electronic device switches to transmitting data using the mobile network, that is, performs subsequent transmission of a data packet of the application only using the mobile network.

Optionally, the method further includes step 104. When the electronic device transmits data using the mobile network, detect the data transmission delay of the wireless local area network. Specifically, a control packet (a probe message) is transmitted using the wireless local area network, a response message corresponding to the probe message is received, and the data transmission delay of the wireless local area network is determined based on a sending time of the probe message and a receiving time of the response message. A sending timestamp may be carried in the control packet (the probe message), and the response message is a data packet returned after a peer end successfully receives the probe message. The data transmission delay of the wireless local area network may be a time difference between a receiving timestamp of the response message of the control packet and the sending timestamp of the control packet. Calculation of the data transmission delay is described in detail in the following content.

In another embodiment, as shown by ②in FIG. 10, when the electronic device transmits data using both the wireless local area network and the mobile network, if the data transmission delay of the wireless local area network is less than the first threshold, the electronic device switches to transmitting data using the wireless local area network, and then steps 101 to 104 are performed.

In another embodiment, as shown by ③ in FIG. 10, the electronic device keeps transmitting the data packet of the application still using both the wireless local area network and the mobile network.

In another embodiment, after step 104, as shown by ④ in FIG. 10, when the electronic device transmits data using the mobile network, if it is detected that the data transmission delay of the wireless local area network is less than the first threshold, the electronic device switches to transmitting data using the wireless local area network, and then steps 101 to 104 are performed.

When the data transmission delay of the wireless local area network is less than the first threshold, it indicates that the wireless local area network can provide the foregoing optimal user experience. Switching from the mobile network to the wireless local area network can reduce traffic consumption of the mobile network.

In another embodiment, as shown by ⑤ in FIG. 10, when the electronic device transmits data using the mobile network, if it is detected that the data transmission delay of the wireless local area network is greater than the first threshold, and the data transmission delay of the mobile network is greater than the first threshold, the electronic device switches to transmitting data using both the wireless local area network and the mobile network, and then step 102 is performed, that is, steps 102 to 104 are performed.

In another embodiment, as shown by ⑥ in FIG. 10, when data is transmitted using the mobile network, if it is detected that the data transmission delay of the wireless local area network is greater than the second threshold, and the data transmission delay of the mobile network is greater than the first threshold and less than the second threshold, the electronic device transmits the data packet of the application still using the mobile network, and then steps 103 and 104 are performed.

In another embodiment, as shown by ⑥ in FIG. 10, when data is transmitted using the mobile network, if it is detected that the data transmission delay of the wireless local area network is greater than the first threshold, and the data transmission delay of the mobile network is less than the first threshold, the electronic device transmits the data packet of the application still using the mobile network, and then steps 103 and 104 are performed.

In other embodiments, a first time difference may be preset. A step of switching network is performed only when a data transmission delay becomes greater or less than a preset threshold (the first threshold or the second threshold) and stays greater or less than the preset threshold for the first time difference. Therefore, overheads caused by repeated network switching due to fluctuation of the data transmission delay in a short time can be avoided.

In other embodiments, a first threshold and a second threshold that correspond to another network parameter can also be set. When it is detected that the network parameter reaches a threshold, switching between the foregoing three network states is performed. The other network parameter may be one or more of the parameters such as a packet loss rate, a throughput, and a delay variation. A network switching method is similar to the foregoing method steps of network switching based on the data transmission delay, and details are not described herein.

Because the mobile network is related to network traffic of a user, and is further related to traffic billing of the user, in another embodiment provided in this application, prompt information on whether to enable a network switching function can be provided to the user, and an instruction for triggering the switching prompt information by the user can be received. The network switching methods provided in the embodiments of this application can be enabled according to this trigger instruction such that the user can be aware of network switching, to avoid causing losses to the user and improve user experience. In a possible implementation, the prompt information may be in a form of a prompt box, for example, information displayed in the prompt box is "Do you want to enable network switching?" or "Do you agree to use the mobile network?" Further, the prompt box may include a "Yes" button and a "No" button. When the user taps the "Yes" button in the prompt box, it indicates that the user agrees to enable the network switching method provided in this application. Optionally, the prompt box may be provided for the user by an application. For example, the prompt box is provided for the user in an application similar to "Game Assistant", "Network Settings", or the like. Alternatively, a plug-in having this function may be downloaded, and the prompt box is displayed in an interface of the plug-in after the plug-in is loaded.

In the network switching method provided in this embodiment of this application, the transmit end further processes an original data packet and then sends a processed data packet. Specifically, a header is added, the original packet is encapsulated, and after the encapsulation, a data packet is sent to the receive end using a communications module. The data packet herein may be the foregoing data packet of the application, or the foregoing control packet.

Figure 11:
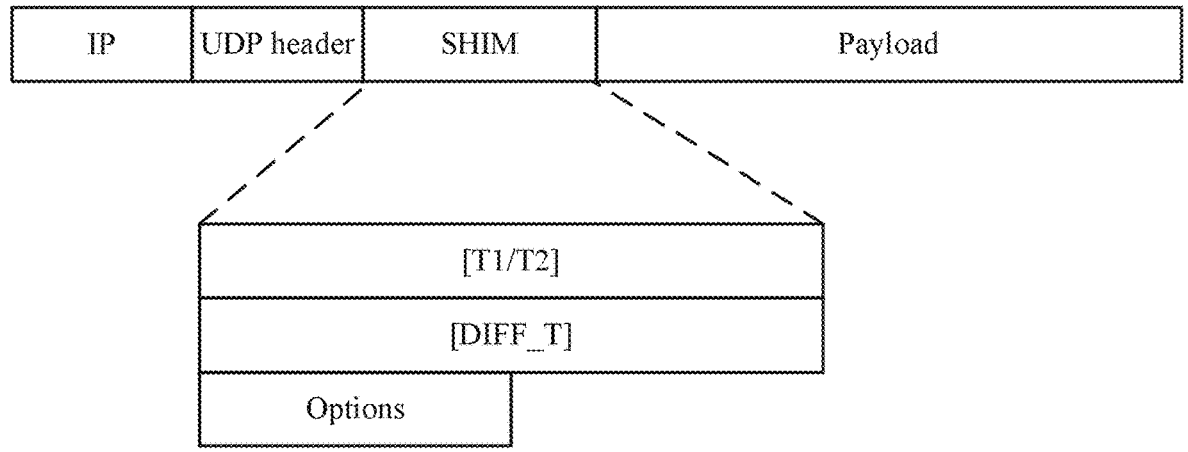
FIG. 11 is a schematic structural diagram of a packet according to an embodiment of the present disclosure.
Figure 12:
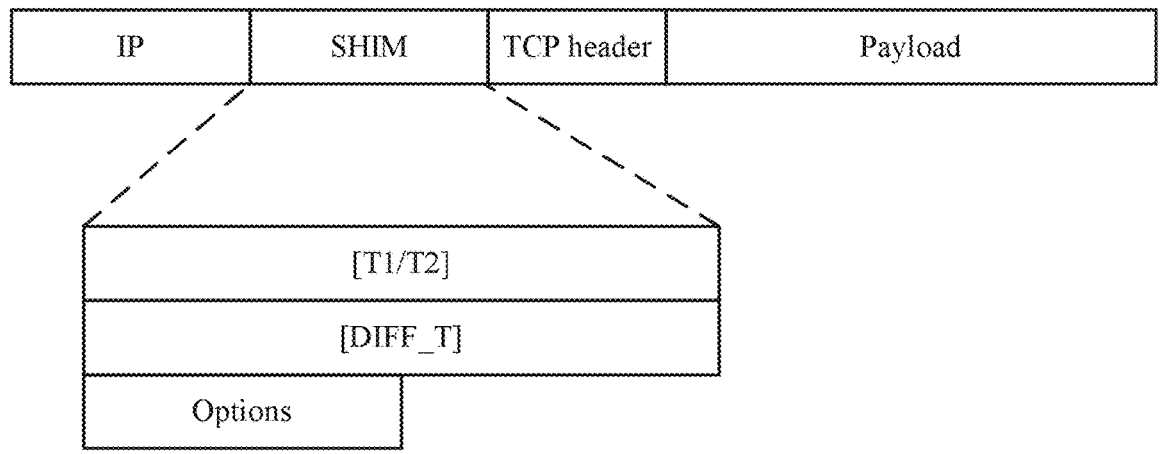
FIG. 12 is a schematic structural diagram of a packet according to an embodiment of the present disclosure.

That a transport layer protocol is TCP or UDP is used as an example, the transmit end distinguishes between a TCP packet and a UDP packet for different processing. For the UDP packet, payload in the UDP packet can be taken out, a segment of space is taken out from the packet and is used as an added header, which is referred to as a shim header, and then layer-by-layer encapsulation processing for protocol layers is subsequently performed. A format of a packet that is eventually sent is shown in FIG. 11. For the TCP packet, a TCP header and payload in the TCP packet are taken out, and a segment of space is taken out from the packet and is used as an added header, which is referred to as a shim header. The shim header encapsulates the TCP header and the payload, and a format of a packet that is eventually sent is shown in FIG. 12. The shim header may include a sending timestamp at which the transmit end sends the data packet, and may further include options information, which may include security information (such as a token) and an address of a receive end.

A format of a response message returned by the receive end may also be shown in FIG. 11 or FIG. 12. The response message returned by the receive end may be ACK information or may be a data packet returned to the transmit end after the receive end receives a data packet sent by the transmit end. The response message returned by the receive end includes the sending timestamp T1 at which the transmit end sends the data packet, may further include a receiving timestamp T2 at which the receive end receives the data packet, and may further include a time difference DIFF_T between a timestamp at which the receive end receives the data packet and a sending timestamp at which the receive end sends the response message.

Figure 13:
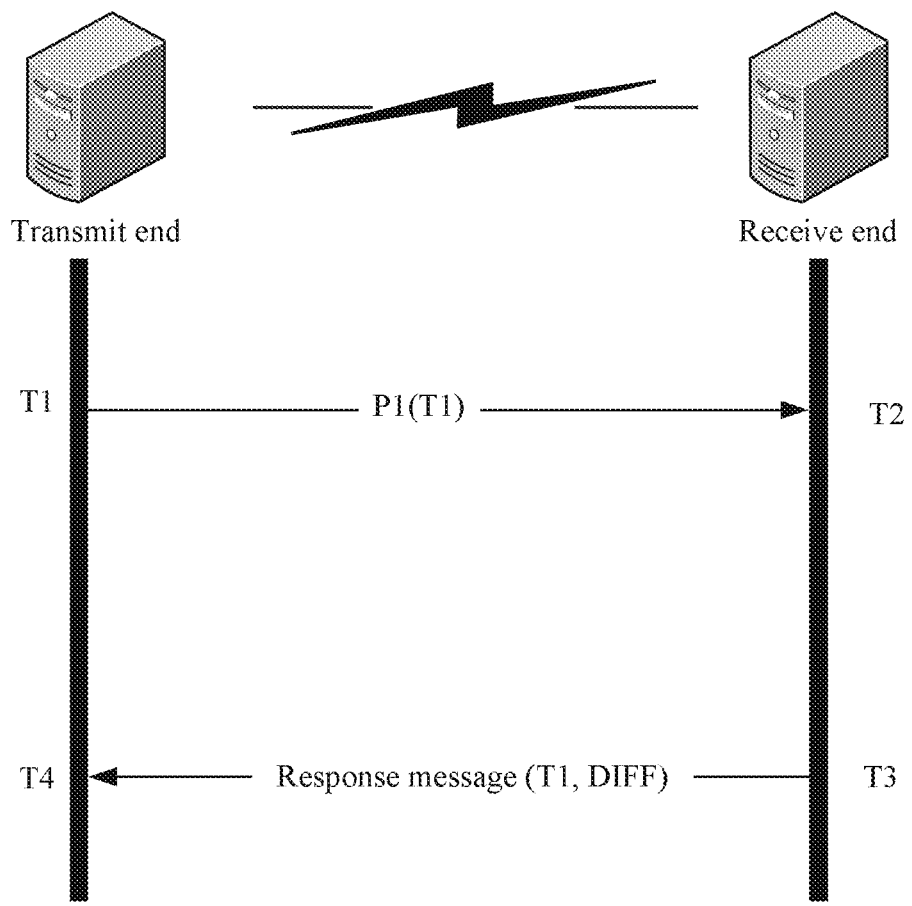
FIG. 13 is a schematic diagram of a data transmission delay according to an embodiment of the present disclosure.

The delay is used as an example to describe delay calculation manners for networks. The data transmission delay mentioned in this application may be an RTT. As shown in FIG. 13, a sending timestamp T1 is carried in a data packet P1 sent by a transmit end at a T1 moment. A receive end receives the data packet P1 at a T2 moment, and after an interval DIFF, the receive end returns a response message to the transmit end at a T3 moment. The transmit end receives the response message at a T4 moment. In this case, the delay RTT is RTT=T4−T1−DIFF_T, where DIFF_T=T3−T2. The response message carries the sending timestamp T1 and the interval DIFF_T. The interval may be a time consumed during processing on a received data packet by the receive end. When the receive end is an agent of a server, the interval may include a difference between a time when the agent of the server sends a received data packet to a server and a time when the agent of the server receives a returned packet from the server. Therefore, the data transmission delay in the embodiments of this application is obtained based on a time difference between a sending timestamp of a data packet and a receiving timestamp of a response message of the data packet. Optionally, the data transmission delay may be obtained after smoothing a plurality of time differences obtained through calculation.

A data packet sent by the transmit end to the receive end further carries an identifier, and the identifier may be specifically an MSS option and can be carried in the options. Using a TCP packet as an example, when a length of a TCP packet sent by the transmit end is large, segmentation occurs during transmitting, and reorganization is performed at the receive end. Similarly, fragmentation occurs when a length of an IP packet exceeds a particular value, and fragments are reorganized at the receive end. A value of the MSS option indicates a length of a maximum data segment that is of a data packet and that can be transmitted each time. When a length of a TCP packet is greater than the value of the MSS, segmented transmission needs to be performed. The transmit end modifies the value of the MSS option, to avoid that a packet exceeds a fragment length limit because a shim header is added. A sum of a modified value of the MSS and a length of the shim header is less than or equal to the fragment length limit.

Based on the foregoing embodiments, an embodiment of this application further provides a SOC. The SOC includes an application processor, and a modem and a WI-FI module that are configured to transmit data. The application processor can implement the network switching method provided in any one or more of the foregoing embodiments. The WI-FI module may be a separate chip, or may be integrated with the application processor or the modem.

Base on the foregoing embodiments, an embodiment of this application further provides an electronic device. The electronic device includes the SOC such that the electronic device can implement the network switching method provided in any one or more of the foregoing embodiments.

Based on the foregoing embodiments, an embodiment of this application further provides a computer storage medium. The storage medium stores a computer instruction, and when the computer instruction is read and executed by one or more processors, the network switching method provided in any one or more of the foregoing embodiments can be implemented. The computer storage medium may include various media that can store program code or a computer instruction, such as a universal serial bus (USB) flash drive, a removable hard disk, a ROM, a RAM, a magnetic disk, or an optical disc.

Based on the foregoing embodiments, this application provides a computer program product, and the computer program product includes a computer instruction. When the computer instruction is executed by a processor, the processor is enabled to perform the network switching method provided in any one or more of the foregoing embodiments.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc ROM (CD-ROM), an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct a computer or another programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provides steps for implementing a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A network switching method implemented by an electronic device, wherein the network switching method comprises:

transmitting data in a first mode, wherein the first mode uses only a wireless local area network (WLAN) from between the WLAN and a mobile network;

comparing a first data transmission delay of the WLAN to a first preset threshold and a second preset threshold that is greater than the first preset threshold;

switching from transmitting the data in the first mode to transmitting the data in a second mode when the comparing indicates that the first data transmission delay is greater than the first preset threshold and less than the second preset threshold, wherein the second mode uses the WLAN and the mobile network; and switching from transmitting the data in the second mode to transmitting the data in a third mode when the first data transmission delay is greater than the second preset threshold, wherein the third mode uses only the mobile network from between the WLAN and the mobile network.

2. The network switching method of claim 1, further comprising switching from transmitting the data in the second mode to transmitting the data in the first mode when the first data transmission delay is greater than the first preset threshold and when a second transmission delay of the mobile network is greater than the first preset threshold.

3. The network switching method of claim 1, further comprising switching from transmitting the data in the third mode to transmitting the data in the first mode when the first data transmission delay is less than the first preset threshold.

4. The network switching method of claim 1, further comprising detecting the first data transmission delay while the electronic device transmits the data in the third mode.

5. The network switching method of claim 1, further comprising switching from transmitting the data in the second mode to transmitting the data in the first mode when the first data transmission delay is less than the first preset threshold.

6. The network switching method of claim 1, further comprising switching from transmitting the data in the second mode to transmitting the data in the third mode when the first data transmission delay is greater than the second preset threshold and a second data transmission delay of the mobile network is less than the second preset threshold.

7. The network switching method of claim 1, further comprising switching from transmitting the data in the second mode to transmitting the data in the third mode when the first data transmission delay is greater than the first preset threshold and less than the second preset threshold and a second data transmission delay of the mobile network is less than the first preset threshold.

8. The network switching method of claim 4, further comprising:
transmitting a probe message using the wireless local area network;
receiving a response message corresponding to the probe message; and
determining the first data transmission delay based on a sending time of the probe message and a receiving time of the response message.

9. The network switching method of claim 1, wherein the data comprises a data packet of a first application, and wherein the first data transmission delay is of transmitting the data packet of the first application.

10. The network switching method of claim 9, wherein the first preset threshold and the second preset threshold are preconfigured for the first application.

11. An electronic device, comprising:
a processor; and
a memory coupled to the processor and storing instructions that, when executed by the processor, cause the electronic device to be configured to:
transmit data in a first mode, wherein the first mode uses only a wireless local area network (WLAN) from between the WLAN and a mobile network;
compare a first data transmission delay of the WLAN to a first preset threshold and a second preset threshold that is greater than the first preset threshold;
switch from transmitting the data in the first mode to transmitting the data in a second mode when the comparison indicates that the first data transmission delay is greater than the first preset threshold and less than the second preset threshold, wherein the second mode uses the WLAN and the mobile network; and
switch from transmitting the data in the second mode to transmitting the data in a third mode when the first data transmission delay is greater than the second preset threshold, wherein the third mode uses only the mobile network from between the WLAN and the mobile network.

12. A system on a chip (SoC) configured to transmit data, the SoC comprising:
a WI-FI circuit;
a modem coupled to the WI-FI circuit; and
an application processor coupled to the WI-FI circuit and the modem and configured to:
compare a first data transmission delay of the WI-FI circuit to a first preset threshold and a second preset threshold that is greater than the first preset threshold;
switch to transmitting the data in a first mode when the comparison indicates that the first data transmission delay is greater than the first preset threshold and less than the second preset threshold, wherein the first mode uses both the WI-FI circuit and the modem; and
switch from transmitting the data in the first mode to transmitting the data in a second mode when the first data transmission delay is greater than the second preset threshold, wherein the second mode uses only the modem from between the WI-FI circuit and the modem.

13. The SoC of claim 12, wherein the application processor is further configured to switch from transmitting the data in the second mode to transmitting the data in the first mode when the first data transmission delay is greater than the first preset threshold and a second data transmission delay of the modem is greater than the first preset threshold.

14. The SoC of claim 12, wherein the application processor is further configured to switch from transmitting the data in the second mode to transmitting the data in a third mode when the first data transmission delay is less than the first preset threshold, and wherein the third mode uses only the WI-FI circuit from between the WI-FI circuit and the modem.

15. The SoC of claim 12, wherein the application processor is further configured to detect the first data transmission delay while the modem transmits the data.

16. The SoC of claim 12, wherein the application processor is further configured to switch from transmitting the data in the first mode to transmitting the data in a third mode when the first data transmission delay is less than the first preset threshold, and wherein the third mode uses only the WI-FI circuit from between the WI-FI circuit and the modem.

17. The SoC of claim 12, wherein the application processor is further configured to switch from transmitting the data in the first mode to transmitting the data in the second mode when the first data transmission delay is greater than the second preset threshold and a second data transmission delay of the modem is less than the second preset threshold.

18. The SoC of claim 12, wherein the application processor is further configured to switch from transmitting the data in the first mode to transmitting the data in the second mode when the first data transmission delay is greater than the first preset threshold and less than the second preset threshold and a second data transmission delay of the modem is less than the first preset threshold.

19. The network switching method of claim 1, wherein transmitting the data in the second mode comprises redundantly transmitting the data using the WLAN and the mobile network.

20. The network switching method of claim 1, wherein the first preset threshold is set based on service logic statistics collection and analysis based on user behavior.

\* \* \* \* \*